Oct. 27, 1959     C. K. RAZAK     2,910,254
BOUNDARY LAYER CONTROL APPARATUS RELATING TO AIRCRAFT
Filed July 27, 1955     2 Sheets-Sheet 2
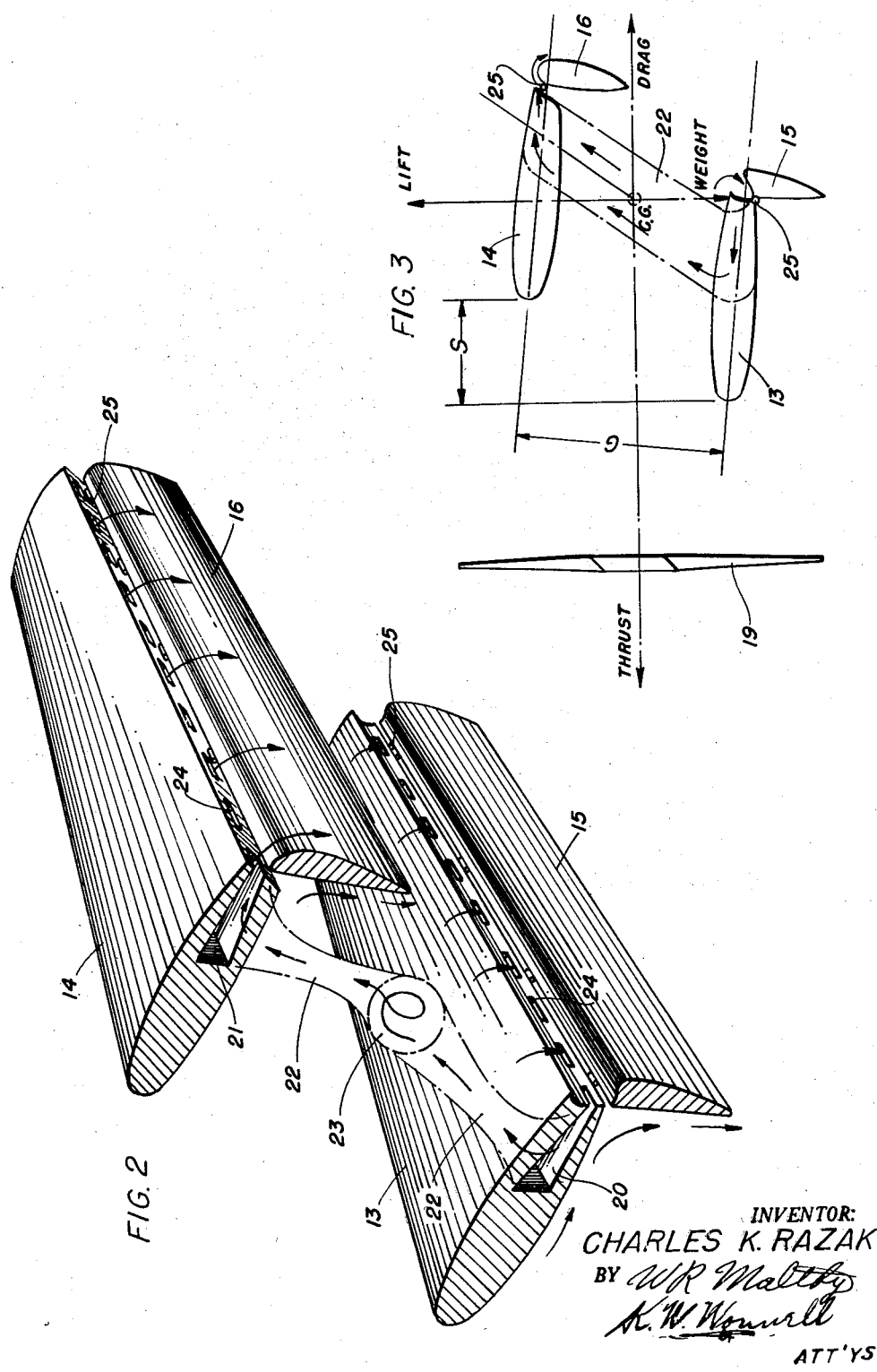
INVENTOR:
CHARLES K. RAZAK
BY
ATT'YS

United States Patent Office

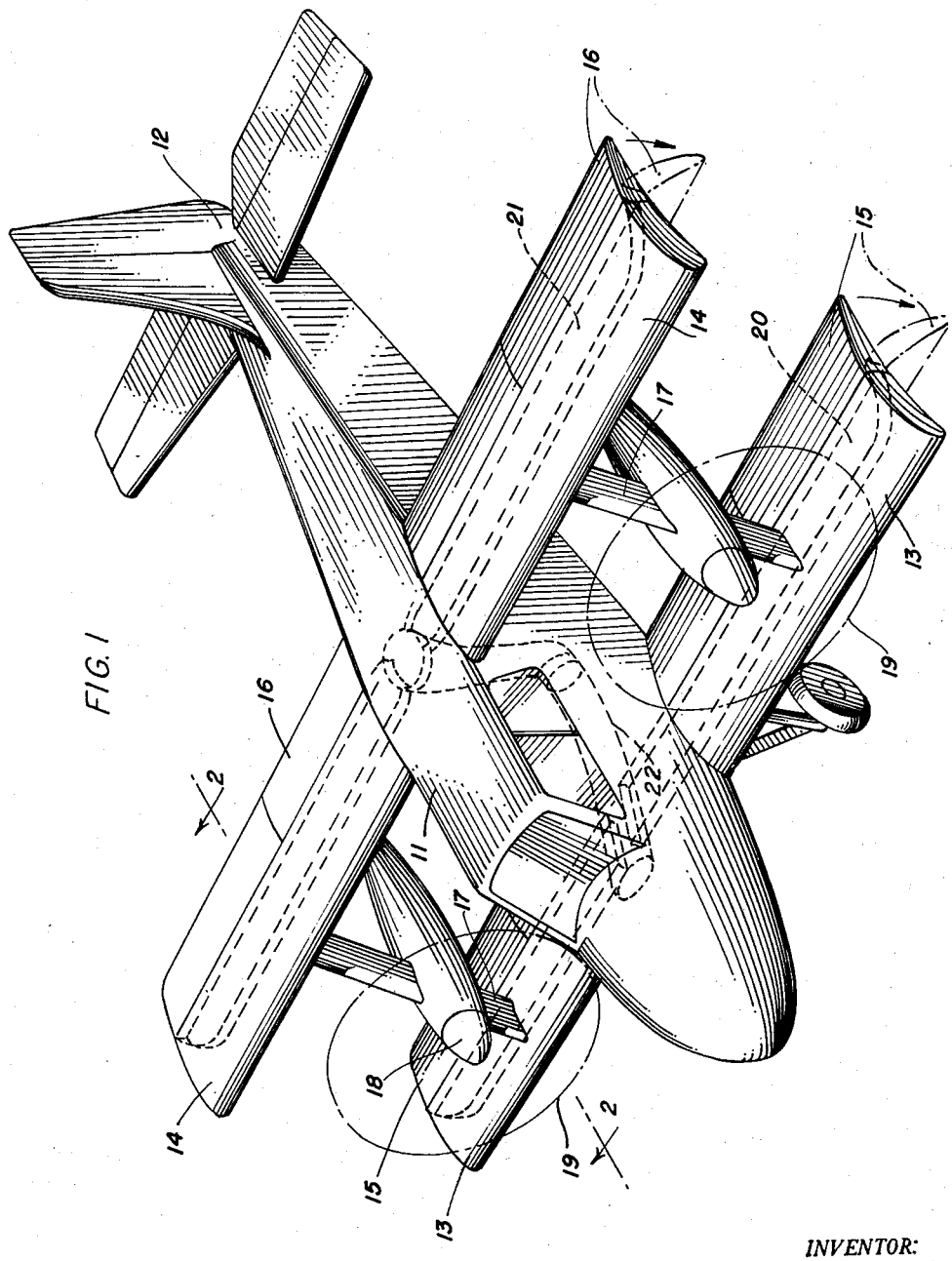

2,910,254
Patented Oct. 27, 1959

2,910,254

BOUNDARY LAYER CONTROL APPARATUS RELATING TO AIRCRAFT

Charles Kenneth Razak, Wichita, Kans., assignor, by mesne assignments, to the United States of America as represented by the Secretary of the Navy Application July 27, 1955, Serial No. 524,826

10 Claims. (Cl. 244—42)

This invention relates to a new and novel apparatus for applying boundary layer control to airfoils of aircraft. More particularly, this invention relates to boundary layer control of the forced circulation type whereby deflection of the slipstream from the propeller may be achieved with improved efficiency. The apparatus of this invention may be readily utilized for the production of aircraft capable of vertical and near-vertical as well as hovering flight.

Several methods for achieving vertical and hovering flight have been heretofore used with varying degrees of success. The well-known helicopter, for example, which requires the use of a rotating wing system, is capable of vertical take-off and landing and of maintaining itself in a stationary position in the air in hovering flight as well as moving forward, rearward or to the side. Despite these advantages, however, the extreme complications and expense involved in the construction, maintenance and operation of helicopters extremely limits their use on an extensive basis. A further disadvantage of the rotary wing type aircraft lies in the limitations on forward speeds necessarily imposed by virtue of the design characteristics required thereby.

Another device for achieving the purpose consists of the use of a very high thrust propeller which is capable of lifting the aircraft vertically upward. This approach has not proven very satisfactory because of high costs, excessive weight, and considerable difficulties in maintenance, repair, service and operation.

Other techniques for securing hovering flight have consisted of using a series of cascades which deflect the blast of a propeller downwardly, thereby obtaining a momentum reaction which may be applied to sustaining hovering flight. Such wing combinations, however, require extreme camber which make high-speed forward flight virtually impossible.

In addition to the foregoing disadvantages present in prior art types of aircraft designed for vertical and hovering flight, the hazards attributable to excessive weight or the presence of a large number of moving components, extreme sensitivity to atmospheric conditions and related factors present numerous complications which are difficult to overcome. This is particularly true where drastic changes in position of structural components such as the propeller or basic wing structures are required in the transition from one type of flight to another, i.e. from vertical to horizontal flight or vice versa. It is readily seen that a loss of power or jamming of the controls during such transition or manipulation could prove to be extremely dangerous.

There is a definite need therefore for improvements in the design of aircraft adapted for use in vertical and hovering flight whereby excess weight, a large number of moving parts, high camber wings and other factors of a limiting or hazardous nature are minimized or completely eliminated. Preferably, the aircraft should be capable of flying at high forward speed with a minimum of modification in the external configuration of conventional airplanes and without any heavy penalty in weight, expense, hazards, and complications in either construction, maintenance or operation.

An intensive study of boundary layer phenomena conducted in recent years has led to the development of various methods and aircraft designs adapted for utilizing boundary layer control whereby the circulation of the air mass over the surface of aircraft is improved. By improving the circulation, particularly with respect to the wing system and related airfoil surfaces of aircraft, it has become possible, for example, to design aircraft which require substantially shorter runways for take-off and landing purposes.

Boundary layer control aimed at drag reduction or lift increase or both and which serves to retard or prevent the transition from laminar flow to turbulent flow within the boundary layer or prevent the separation of a turbulent boundary layer may be achieved by several methods including (1) the use of porous surfaces or slots in the airfoil structure or (2) forced circulation involving suction or blowing whereby the basic circulation around the airfoil is greatly increased. The first method may be used, for example, to increase the lift coefficient of a wing by leading edge suction through porous surfaces or slots to delay reversal of the boundary layer and permit the normal airfoil lifting properties to be extended to higher angles of attack. The second method, involving increasing the circulation around a profile at a given angle of attack thereby inducing higher lift coefficients, is referred to as forced circulation because power or energy expenditure is necessary for producing the function. In general, modern methods of boundary layer control for the purpose of preventing separation are based on the principles of either infusing kinetic energy into the flow, or by removing boundary layer through suction.

Ordinarily, the pressure gradients in the vicinity of the flap leading edge are sufficiently high so that the boundary layer is unable to proceed around the corner when the flap is in a deflected position. As a result, the boundary layer reverses and separates at the point of the flap bend, thereby causing a wide turbulent break behind the airfoil which produces a high drag and only moderate increases in lift.

The action of a blowing jet around the surfaces of a flap serves to accelerate the boundary layer whereby the turning action of the air is increased in such a manner that it flows downward along the upper surface of the deflected flap and the flow quantity around the wing is deflected through a much higher angle than otherwise possible without blowing. Much the same action may be achieved by sucking the boundary layer into a slot or porous surface at the flap hinge point in that the low energy air is removed, thereby permitting the high energy air which exists in the potential flow to move around the flap hinge. Thus, the deflection of the total air mass moving past the wing may be substantially increased without extensive separation of the boundary layer from the airfoil surface.

I have now discovered that by applying the combination of suction and blowing in the wing structure of an aircraft of the bi-plane type in a manner hereinafter described in detail, it becomes possible to achieve a sufficiently high lift coefficient whereby a relatively simple type of aircraft can be adapted for vertical or near-vertical and hovering flight without the aforesaid disadvantages and penalties.

The device of the present invention consists essentially of a fixed-wing bi-plane operating in a finite slipstream produced by high thrust engines. Deflection of the air mass along the wing surfaces is achieved by operation of an efficient flap system extending substantially along the length of the trailing edges of the lower and upper wings respectively. It has been found that by applying suction along the trailing edge of one wing and blowing from the other, a highly improved boundary layer circulation is obtained whereby the deflection produced by the flaps may be extended appreciably through higher angles than heretofore possible without causing separation of the boundary layer in the region of the flap bends.

The apparatus herein disclosed for deflecting the slipstream with sufficiently improved efficiency to sustain a bi-plane in vertical and hovering flight represents a very significant advance in the art particularly since, in fixed wing systems, four or more wings have been heretofore required to produce the necessary lift component or momentum as in the case of the cascade wing structures commonly referred to as the "Venetian blind." The present invention further eliminates the penalty on normal flight velocities in that high camber wings are not required. Conversion from vertical or hovering flight to normal flight is also greatly simplified, necessitating only the retraction of the trailing edge flaps to provide a smooth air foil.

The combination of sucking or exhausting and blowing applied to the trailing edge flaps of the lower and upper wings respectively of the bi-plane type of aircraft herein disclosed imposes only moderate power requirements, especially when compared with vertical take-off aircraft operating under direct propeller thrust. By virtue of the high lift system made possible by the method of boundary layer control herein described, the bi-plane is capable of practically vertical take-off and landing as well as hovering and normal flight in essentially a horizontal position. Accordingly, no abnormal attitudes of the aircraft are induced and flight is markedly simpler, safer and more natural than with movable fuselage aircraft which are designed to take-off with the fuselage pointed vertically upward.

The system of wings equipped with highly effective flaps utilizing circulation and boundary layer control operated behind high thrust propellers may also be used for maintaining a novel system of control during operation. This can be accomplished by staggering the wings in a manner such that the pitching moments of the sections are counteracted by the lifting forces of the wings. Disposition of the relative lift between the two wings can be made by either adjusting the pumping quantity or controlling flap angles whereby the aircraft can be made to nose up or down thereby providing means for directing the flight path of the aircraft. Yaw and roll can similarly be controlled by manipulating flap angles during operation.

It is accordingly an object of this invention to provide a novel apparatus for deflecting a column of horizontally moving air produced by the propeller with improved efficiency whereby a momentum reaction sufficient to sustain a bi-plane type aircraft in vertical and hovering and near-vertical flight is made available.

It is another object of this invention to provide a novel apparatus for the utilization of boundary layer circulation control of the exhausting and blowing type for improving the lift coefficient of a bi-plane wing system equipped with efficient flaps.

It is a further object of the invention to provide a novel apparatus for controlling the flight path of aircraft of the bi-plane type utilizing a combined suction and blowing circulation from the trailing edge of the wings over the flaps associated therewith.

It is yet another object to provide apparatus for facilitating the conversion from vertical to normal flight without substantially altering the attitude of the aircraft or drastically changing the position of major components of the aircraft.

It is also an object of this invention to provide a novel wing structure adapted for utilizing boundary layer control of the forced circulation type whereby aircraft equipped therewith can be utilized for vertical, hovering and normal flight with greatly improved safety, simplicity, control and maintenance.

It is yet another object to provide an aircraft capable of vertical and hovering flight containing a substantially reduced number of moving components without penalizing normal flight velocity and related functions thereof.

A still further object of this invention is to provide a simplified wing structure for use in conjunction with circulation and boundary layer control whereby fixed-wing type aircraft of the bi-plane type operating in a finite slipstream produced by high thrust propellers adapted for vertical and hovering flight may be manufactured, operated and maintained at substantially reduced costs.

Other objects and advantages will become apparent as this specification proceeds.

The invention is shown in an illustrative embodiment in the accompanying drawings in which:

Fig. 1 is a perspective view of a bi-plane wherein the dotted lines schematically represent the means for implementing the boundary layer circulation control system of my invention;

Fig. 2 is a perspective view of the wings partly in section taken 2—2 in Fig. 1 showing the flaps in deflected position, wing structural details and further showing a schematic representation of the ducting and pumping means of the system; and Fig. 3 is an end view of the main airfoil components of the bi-plane illustrating one embodiment of the gap and stagger relationship between the lower and upper wings of the aircraft.

Proceeding now to the more detailed description of my invention, the aircraft shown in Fig. 1 comprises a main body including cabin 11 and conventional tail assembly 12 for high speed flight consisting of the rudder, elevator, stabilizer, etc. Lower wing 13 and upper wing 14, preferably extending for strength through the main body of the airplane, are equipped with deflectable and retractable flaps 15 and 16 respectively, which may be segmented as shown in Fig. 1 or continuous. Engine mounts 17 provide support for motors 18 which actuate propellers 19 thereby providing a finite slipstream along the wing span on both sides of the aircraft. Although only one motor is shown in Fig. 1 on each side of cabin 11, additional motors symmetrically arranged along the wing span may be used as, for example, in the construction of a four-engine type aircraft. High thrust propellers should be used for providing the aforesaid slipstream and, if desired, the propellers preferably of the three-bladed type may be shrouded in any suitable manner (not shown) for improving the thrust.

The dot-dash lines in Fig. 1 shown at the extremities of the lower and upper wings 13 and 14 indicate a partially deflected positioning of flaps 15 and 16. The dotted lines on the wing assembly designate passages or cavities 20 and 21 in the rear portions of the respective wings 13 and 14. Ducting 22 located preferably centrally within the main body of the aircraft is essentially leakproof and provides communication between the wing cavities 20 and 21. Within the ducting 22, a conventional pumping system of the suction or blowing type, preferably an axial flow fan or blower 23, is so arranged that fluid within one wing cavity may be readily transferred to the cavity of the other wing by the action thereof. The ducting 22 may be made of plastic, metal, or other suitable material.

The details of the boundary layer circulation control system of the present invention are more clearly shown in Fig. 2 wherein the drawing illustrates one embodiment of the wing cavity utilizing a rectilinear shape. The geometry of the wing cavities may be varied to include a curvilinear or other shape in lieu of the form shown. The rear wall of the cavity within each wing is formed with a series of through slots 24 which provide for the passage of boundary layer fluid between each cavity and the trailing edge of the wing in which the cavity is located. A continuous narrow slit, spaced holes or other passage configurations may be used but a slotted arrangement substantially as shown at 24 is preferred for exhausting air from the upper skin surface of the wing or discharging air from within the cavity over the upper surface of a deflected flap.

The flaps 15 and 16 are attached to the trailing edges of the respective fixed wings 13 and 14 by any suitable means as by flap hinges 25 shown in Fig. 2, and each flap should be highly efficient and capable of deflection to angles up to 120° relative to the wing associated therewith. Upon complete retraction of each flap, a smooth wing-flap airfoil should be formed devoid of excessive camber. The contour of the trailing edge of each wing and the leading edge of the flap may also be of variable design as shown in the figures provided that the passages 24 are sufficiently exposed when the flap is deflected and sealed when the same is retracted.

During operation with deflected flaps, the cavity 20 of the wing 13 is utilized for exhausting slipstream air through the openings 24 exposed by the deflected flap 15. The action of this air being drawn within the wing 13 produces a turning of the major flow above the profile of that wing so that this air follows the contour of the adjacent edge of the deflected flap 15, thereby greatly enhancing the lifting power of the wing. The wing 13 is sometimes referred to hereinafter as the exhausting or sucking wing, and the flow is indicated by arrows in Figs. 2 and 3.

The air collected within the exhausting wing 13 is conducted through the ducting 22 and passes through the pumping means 23 to the cavity 21 within the other wing 14, from which it is discharged through apertures 24 disposed above and ahead of the deflected flap 16. After flowing through the slots 24 in the wing 14, the air impinges tangentially upon the upper surface of the deflected flap 16. The effect of the flap curvature, shown most clearly in Fig. 3, is to turn this blown air substantially along the upper surface of the flap 16. This produces a fixed stagnation point at the trailing edge of the flap 16 and causes the major air flow over the top of the wing airfoil to be deflected downward approximately in conformity with the flap's upper surface, thereby greatly improving the lifting power of the wing structure. The wing 14 is sometimes referred to hereinafter as the discharging or blowing wing, and the flow is indicated by arrows in Figs. 2 and 3.

Although either wing may be utilized as a sucking wing provided the other is used as a blowing wing in conjunction therewith, it is preferred to adapt the lower wing 13 for suction and the upper wing 14 for blowing for reasons of improved stability during operation and related considerations.

The stagger S and gap G arrangement indicated in Fig. 3 between the lower and upper wings 13 and 14 of the bi-plane herein disclosed for vertical or near-vertical and hovering flight may be varied from a superimposed position to a negative stagger of approximately one-wing chord length. In a preferred embodiment, depicted in Fig. 3, a negative stagger of about one-half chord length and a gap approximately equal to the chord length substantially as shown therein provide a satisfactory design. With this arrangement of the wings with the lower wing 13 in a forward position, the air which is deflected downward by the upper flap 16 will not interfere with the air which is being deflected downward by the lower wing.

The dual wing system herein described incorporating boundary layer circulation control and highly deflected flaps is capable of turning the high momentum slipstream of the thrusting propellers downward with such an improved efficiency that the forces produced thereby are capable of lifting the aircraft vertically.

With deflection of the flaps 15 and 16, the craft may be induced to move forward or backward by the horizontal components of the force system schematically represented in Fig. 3. As the forward speed after take-off is increased, the flaps are gradually retracted, so that less and less of the air is turned downward. When the flaps are fully retracted, the circulation control system is shut down. With the wings and retracted flaps providing smooth airfoils the airplane operates in the conventional manner for forward flight. The landing operation is performed using a reverse order sequence. The transition between hovering and forward flight may be made at ground clearance level or at altitude as desired. For hovering flight, a change in attitude of only about 15° is required with the arrangement set forth as the preferred embodiment.

During operation of the aircraft embodying the modifications herein disclosed, novel control means are made possible involving the functions of rolling, yawing, pitching, etc. The distribution of the relative lift of each wing may be controlled, for example, by regulating the quantity of air flowing through the circulation control system or by manipulating the flap angles as required to balance the involved forces. Differential flap settings on the lower and upper wings symmetrically about the center line of the craft result in pitch control. Upon increasing the thrust of the propeller or propellers on one side of the aircraft, the lift on that side of the craft's center line increases accordingly and the airplane is thus caused to roll. Yaw is produced by moving the opposing flaps in opposite directions to produce a forward acting force on one side and a rearward acting force on the other resulting in the orientation of the craft in the direction of the resultant of forces.

While in the foregoing specification this invention has been described in relation to a preferred embodiment thereof and specific details of this embodiment have been set forth for the purpose of illustration, it will be apparent to those skilled in the art that this invention is susceptible to other embodiments and that many of the details herein set forth can be varied considerably without departing from the basic concept of the invention.

I claim:

1. In a propeller-driven airplane having at least one propeller at each side to provide a finite slipstream over the wing structure of the airplane, the combination of lower and upper wings, each having a cavity, ducting establishing communication between said cavities, the trailing edges of said wings having symmetrically arranged slots therethrough communicating with the respective cavities, flaps movably attached to said wings and arranged when fully retracted to close said slots and when deflected to expose said slots to the atmosphere, and pumping means associated with said ducting and operative, when said slots are exposed, to suck air from the atmosphere into the lower cavity through said slots at the flap bend of the lower wing and discharge the same air from the upper cavity through said slots at the flap bend of the upper wing and into the atmosphere, said trailing edges having a negative staggered relation, the extent of the stagger being such that the slipstream directed downward by the deflected upper flap will not interfere with the lower slipstream.

2. In an aircraft providing a finite slipstream at each side thereof, a lower wing, an upper wing, each of said wings having a cavity, ducting establishing communication between said cavities, flaps movably connected to the respective wings, said wings at their trailing edges having apertures establishing communication between the atmosphere and the respective cavities when said flaps are deflected downward, said flaps when fully retracted closing said apertures, and a blower located in said ducting and operative when said flaps are deflected downward, said blower being arranged to move air from one cavity to the other cavity, whereby, when said flaps are deflected downward, air is sucked from the atmosphere forward through one apertured trailing edge into the associated cavity, delivered along said ducting and into the other cavity, and discharged rearward from said other cavity through the apertured trailing edge associated with said other cavity into the atmosphere, said trailing edges having a negative staggered relation, the extent of the stagger being such that the slipstream directed downward by the deflected upper flap will not interfere with the lower slipstream.

3. In an aircraft providing a finite slipstream at each side thereof, the combination of lower and upper wing structures projecting at each side from the fuselage, each of said wing structures having cavity means therealong at each side of the fuselage, ducting enclosed in the fuselage and establishing communication between the lower and upper cavity means, the trailing edges of said wing structures at both sides of the fuselage having slots therethrough for establishing communication between the atmosphere and the respective cavity means, and pumping means enclosed in the fuselage and associated with said ducting and arranged to suck air from the atmosphere forward into one of the cavity means and discharge the same air from the other cavity means rearward into the atmosphere, said wings being in negative staggered relation.

4. The structure of claim 2, the wing gap being substantially equal to the wing chord.

5. In an aircraft providing a finite slipstream at each side thereof, a lower wing, an upper wing, each of said wings having a cavity, ducting establishing communication between said cavities, flaps movably connected to the respective wings, said wings at their trailing edges having apertures establishing communication between the atmosphere and the respective cavities when said flaps are deflected downward, said wings being imperforate except at said ducting and apertures, said flaps when fully retracted closing said apertures, and a blower associated with said ducting and operative when said flaps are deflected downward, said blower being arranged to move air from the lower cavity to the upper cavity, whereby, when said flaps are deflected downward, air is sucked forward from the atmosphere through the lower apertured trailing edge into the lower cavity, delivered along said ducting and into the upper cavity, and discharged rearward from the upper cavity through the upper apertured trailing edge into the atmosphere, said trailing edges having a negative staggered relation, the extent of the stagger being such that the slipstream directed downward by the deflected upper flap will not interfere with the lower slipstream.

6. The structure of claim 2, said extent being substantially equal to one-half the wing chord.

7. The structure of claim 2, said extent being substantially equal to one-half the wing chord, the wing gap being substantially equal to the wing chord.

8. The structure of claim 2, said extent being substantially one-half the wing gap.

9. In an aircraft providing a finite slipstream at each side thereof, a lower wing, an upper wing, each wing having a cavity, ducting establishing communication between the cavities, flaps movably connected to the respective wings, the wings at their trailing edges having apertures establishing communication between the atmosphere and the respective cavities when the flaps are deflected downward, the flaps when fully retracted closing the apertures, and a blower located in the ducting and operative when the flaps are deflected downward, the blower being arranged to move air from one cavity to the other cavity, whereby, when the flaps are deflected downward, air is sucked from the atmosphere forward through one apertured trailing edge into the associated cavity, delivered along the ducting and into the other cavity, and discharged rearward from said other cavity through the apertured trailing edge associated with said other cavity into the atmosphere, the wing gap being substantially equal to the wing chord.

10. In an aircraft providing a finite slipstream at each side thereof, upper and lower wings having cavities and trailing edge apertures communicating with the respective cavities, flaps movably connected to the wings, the flaps when fully retracted closing the apertures and when deflected downward exposing the apertures to the atmosphere, blower means, and ducting leading from the blower means rearward to the apertures, whereby, when the flaps are deflected downward, the blower means may move air through the apertures to attenuate turbulence at the trailing edges, the wings being negatively staggered to such an extent that the slipstream directed downward by the upper flap will not interfere with the lower slipstream.

References Cited in the file of this patent

UNITED STATES PATENTS

| | | |
|---|---|---|
| 1,878,808 | Beaver | Sept. 20, 1932 |
| 1,957,277 | Leray | May 1, 1934 |
| 2,271,321 | Wagner et al. | Jan. 27, 1942 |
| 2,568,813 | Lundberg | Sept. 25, 1951 |